United States Patent Office 3,542,825
Patented Nov. 24, 1970

3,542,825
ORGANO(CHLORO) TIN MERCAPTIDES
Peter Albert Hoye, Kinver, England, assignor to Albright & Wilson (Mfg.) Limited, Oldbury, near Birmingham, Warwickshire, England, a British company
No Drawing. Original application Sept. 21, 1965, Ser. No. 489,079. Divided and this application Dec. 12, 1967, Ser. No. 745,052
Int. Cl. C07f 7/22
U.S. Cl. 260—429.7
7 Claims

ABSTRACT OF THE DISCLOSURE

These compounds can be depicted by the formula $(R)(X)(Z)Sn—R^1_2$ wherein R is an alkyl group having up to 20 carbon atoms, X is chlorine, $R^1_2$ is an alkyl group having at least 5 carbon atoms and Z is selected from the group consisting of R, X, $—SR^1$ (where $R^1$ is an alkyl group having 5 to 20 carbon atoms).

---

This invention relates to certain organotin compounds useful as stabilizers for polymers or copolymers of vinyl chloride. This application is a divisional application of application Ser.No. 489,079, filed Sept. 21, 1965, now abandoned.

Many different types of organotin compounds have been described for use as stabilizers for vinyl chloride polymers in recent years, but nevertheless the search continues for alternative stabilizers which may possess economic and/or technical advantage over those stabilizers already known. Organotin compounds are often believed to stabilize vinyl chloride polymers by acting as scavangers for the hydrogen chloride liberated on thermal or light degradation of the polymer. Accordingly, it has been thought that organotin halides would be inferior organotin compounds for the purpose since they would be expected to be less efficient in absorbing the hydrogen chloride liberated on degradation than organotin stabilizers containing a direct carbon-halogen bond.

We have now prepared representative members of a class of organotin compounds which are characterized by the presence of at least one tin-halogen bond and at least one tin-sulphur-carbon linkage and, surprisingly, we find them to be efficient stabilizers for vinyl chloride polymers. Many members of this class of compounds are novel and such compounds constitute a further aspect of the present invention.

Thus from one aspect, the present invention provides a composition comprising a vinyl chloride polymer (which may be a homopolymer or a copolymer which is formed from not more than 20% by weight of other monomers) and from 0.1 to 5% by weight of the polymer of a heat stabilizer having the general formula:

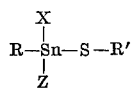

wherein R is a hydrocarbon group, X is a chlorine or bromine, R' is an organic group derived from an organo mercapto compound R'SH and Z is an R, X or —SR' group or an acyloxy group $R''CO_2—$ derived from an organic carboxylic acid $R''CO_2H$.

From a second aspect, the invention provides novel compounds which are included among those which may be used as the heat stabilizers of the first aspect of the invention. These novel compounds are organotin compounds which may be represented by the following general formula

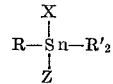

wherein R, X and Z are as hereinbefore defined and $R'_2$ is an organic group having at least 5 carbon atoms which is derived from an organic mercapto compound $R^1_2SH$.

From a third aspect, the invention provides a process for the preparation of the compounds of the invention which comprises reacting substantially stoichiometric amounts of a mono-organotin trihalide or di-organotin dihalide with an organo mercapto compound (of which at least one molecular proportion has at least 5 carbon atoms) and, optionally, a carboxylate salt.

From a fourth aspect, the invention provides a further process for the preparation of those compounds of the invention having the formula

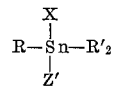

where R, $R'_2$ and X are as hereinbefore defined and Z' is an X or —SR' group (where R' is as hereinbefore defined), which process comprises heating substantially stoichiometric amounts of an organotin mercaptide of the formula $R_aSn(SR')_{4-a}$ (wherein $a$ is 1 or 2 and at least one R' group has at least 5 carbon atoms) with at least one tin halide of the formula $R_bSnX_{4-b}$ (wherein $b$ is 0, 1 or 2) at a temperature of from 50–200° C. to effect a disproportionation reaction. It will be noted that the tin halide may be a mono- or di-organotin halide and/or, when appropriate, a stannic halide.

In the general formula for the compounds which may be employed as stabilizers in the compositions of the invention

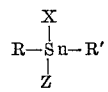

R may be any hydrocarbon group such as an alkyl group having up to 20 carbon atoms, an alkenyl group such as vinyl, or aralkyl group such as benzyl or an aryl group such as phenyl, tolyl or xylyl. However, it is preferred that R shall be an alkyl group having from 4 to 12 carbon atoms, particularly n-butyl or n-octyl. X may represent a bromine or chlorine atom, but preferably for economic reasons it is the latter. The group R' is derived from an organic mercapto compound (R'SH). When there is present in the compounds at least one group R' which has at least 5 carbon atoms (herein designated where necessary as an $R'_2$ group), the compounds are novel and constitute the said second aspect of the invention. Preferably the mercapto compound (R'SH) is an alkyl mercaptan in which the alkyl group has from 4 to 20 carbon atoms, particularly octyl, dodecyl, cetyl or stearyl mercaptan, but R' may also be derived from alkyl esters of mercapto-carboxylic acids such as, for example, thioglycollic or thiomalic acid, such esters preferably having from 4 to 8 carbon atoms in the alkyl group. The group R' may also be derived from a thio-acid or dithioacid of the carboxylic or phosphoric series such as, for example, thiobenzoic acid or a dialkyldithiophosphoric acid or a dialkylthiophosphoric acid.

The group Z in the general formula is normally an R, X or —SR' group which may be different to the other R, X or SR' present in the molecule though normally it will be the same. Alternatively, Z may be an acyloxy group $R''CO_2—$ derived from a carboxylic acid ($R''CO_2H$). Thus, for example, Z may be derived from aliphatic monocarboxylic acids having from 2 to 20 carbon atoms, particularly acetic, 2-ethylhexoic, n-octoic or lauric acid or from dicarboxylic acids such as maleic or succinic acids or half-esters thereof, e.g. benzylmaleic acid; alternatively Z may be derived from aromatic monocarboxylic acids such as benzoic acid. However, this last-mentioned feature is less preferred and it is most preferred that Z should be a further mercapto-residue.

Accordingly, as representative examples of the compounds which may be employed as stabilizers in the compositions of the invention there may be mentioned the following list (List A):

dibutyl-butylmercapto-tin chloride;
butyl-dioctylmercapto-tin chloride;
butyl-dioctylmercapto-tin bromide;
butyl-dodecylmercapto-tin dichloride;
butyl-didodecylmercapto-tin chloride;
butyl-dodecylmercapto-tin (thiobenzoate) chloride;
octyl-dodecylmercapto-tin chloride;
phenyl-dioctylmercapto-tin chloride;
butyl-bis-(iso-octylthioglycollate)tin chloride;
octyl-bis-(butylthiomaleate)-tin chloride;
dibutyl-dodecylmercapto-tin chloride;
dibutyl-octylmercapto-tin bromide;
di-octyl-dodecylmercapto-tin chloride;
di-octyl-iso-octylthioglycollate-tin chloride;
butyl-dodecylmercapto-aceto-tin chloride;
butyl-dodecylmercapto-lauroyl-tin chloride; and
butyl-dodecylmercapto-tin (benzylmaleate) chloride;

all but the first of these compounds are believed to be novel compounds.

The compounds for use as stabilizers in the compositions of the invention may be prepared by reacting a mono- or di-organotin halide with an organic mercapto compound (R'SH) in an amount insufficient to react with all the halogen atoms in the organotin halide and, preferably, in the presence of a tertiary amine as hydrogen halide acceptor. Apart from the amounts of reactants, the normal conditions for reacting organotin halide with organic mercapto compounds are employed. Thus, for instance, the organotin halide and mercapto-compound may be mixed and heated together until reaction, as evidenced by the evolution of hydrogen halide, is complete. A reaction temperature of 40–70° C. is usually sufficient. However, preferably a hydrogen halide acceptor is present, particularly a tertiary amine such as triethylamine or pyridine. The resulting amine hydrohalide may then be removed from the reaction mixture by filtration or by aqueous extraction. The reaction may also be carried out in an inert solvent medium such as a hydrocarbon or ether solvent. The products are usually liquids and are conveniently purified merely by stripping under vacuum. Some of the compounds may also be purified by vacuum distillation. They are, however, susceptive to solvolysis, at least to some extent when contacted with hydroxylic compounds such as water, acids and bases.

When Z in the general formula for the said stabilizers is an R group, a di-organotin halide is reacted with one molecular proportion of the mercapto-compound. When Z is an —SR' group, a mono-organotin halide is reacted with two molecular proportions of one or more of the mercapto-compounds. When Z is a halogen atom, a mono-organotin trihalide is reacted with one molecular proportion of the mercapto-compound. If desired, mixtures of the compounds of the invention may be prepared and employed for the purposes stated, for example by reacting a mono-organotin trihalide with between 1 and 2 molecular proportions of the mercapto-compound. When Z is an acyloxy group, a mono-organotin trihalide is reacted with one molecular proportion of both the mercapto compound and a carboxylate salt; such reactions may be carried out concurrently or successively in either order. The carboxylate salt employed is usually an alkali-metal salt of the carboxylic acid. The metal halide by-product is removed by filtration or aqueous extraction.

Those of the said stabilizers which may be represented by the formula

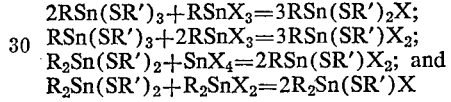

where R, R' and X are as hereinbefore stated and Z' is an R, X or —SR' group, may also be prepared by a disproportionation reaction between an organotin mercaptide of formula $R_aSn(SR')_{4-a}$ (wherein $a$ is 1 or 2) and at least one tin halide of formula $R_bSnX_{4-b}$ (wherein $b$ is 0, 1 or 2). Thus the tin halide may be a mono-organotin trihalide $RSnX_3$, a diorganotin dihalide $R_2SnX_2$, and/or, when appropriate, a stannic halide $SnX_4$. Such reaction is conveniently carried out merely by heating the reactants together in substantially the appropriate stoichiometric amounts to a temperature of from 50° to 200° C., a preferred temperature being 70–100° C.; an inert diluent such as a hydrocarbon or ether may be present, if desired. The appropriate stoichiometric amount for the reactants for this disproportionation or equilibration reaction depends upon the nature of the reactants and the product desired, but the choice of reactants and their proportions can readily be determined from the appropriate reaction equations, examples of which are:

$2RSn(SR')_3 + RSnX_3 = 3RSn(SR')_2X$;
$RSn(SR')_3 + 2RSnX_3 = 3RSn(SR')X_2$;
$R_2Sn(SR')_2 + SnX_4 = 2RSn(SR')X_3$; and
$R_2Sn(SR')_2 + R_2SnX_2 = 2R_2Sn(SR')X$ When the disproportionation reaction is carried out with an organotin halide reactant, the organo groups bound to tin should be identical with those bound to tin in the organotin mercaptide if a unitary product is desired. The disproportionation reaction normally proceeds rapidly to completion so that little or no purification of the product, apart from any solvent stripping, is needed. Such a disproportionation reaction may also be carried out in situ in the vinyl chloride polymer or copolymer during the milling operation by adding the appropriate mixture of disproportionation reagents thereto.

The particular organotin compounds hereinbefore described find use as stabilizers for vinyl chloride polymers and copolymers (herein defined as those derived from not more than 20% by weight of monomers other than vinyl chloride, for example vinyl acetate and/or vinylidine chloride). In compositions comprising these polymers the stabilizers should be incorporated in an amount of from 0.1 to 5%, preferably 0.5 to 2%, by weight of the polymer or copolymer. It has been found that the addition of these compounds confers a more superior degree of stabilization on the vinyl chloride polymer or copolymer than does a conventional organotin mercaptide stabilizer.

Other stabilizers may also be present in admixture with the present organotin compounds, for instance there may be present similar amounts of organic phosphite and/or thiophosphite esters; and/or fatty acid salts of calcium and/or zinc and/or cadmium and/or barium and/or lead; and/or hindered phenols such as 2,6-di-tert.-butyl-4-methyl phenol and 2,4-di-tert.-butyl phenol; and/or basic lead carbonate or stearate. Other organotin stabilizers may also be present if desired. The polymer compositions will often contain one or more plasticisers in conventional amount and may contain other additives conveniently employed, such as pigments and/or extrusion or moulding aids. The polymer compositions of the invention are compounded in conventional manner, for example by calendering or on a two-roll mill.

The invention is illustrated by the following examples in which all quantities are expressed on a weight basis. Examples 1 to 5 illustrate the preparation of novel compounds of the invention and Examples 6 to 16 the compositions of the invention. The term "lauryl" is intended to refer to the mixture of alkyl groups, present in a narrow-cut coconut oil in which at least 50% of the alkyl groups are dodecyl.

EXAMPLE 1

Butyl-dioctylmercapto-tin chloride

Monobutyltin trichloride (94.2 parts, 0.33 mol) was mixed with n-octyl mercaptan (97.3 parts, 0.66 mol) and heated to 60° C. Triethylamine (67.2 parts, 0.66 mol) was added to the stirred mixture during 30 minutes while the temperature was maintained at 60–65° C. Water (50 ml.) was added to dissolve the amine hydrochloride. The organic layer was separated and stripped to 100° C. internal temperature at a pressure of 14 mm. Treatment of the product with a filter aid followed by filtration yielded butyl-dioctylmercapto-tin chloride (115 parts) as a colourless liquid.

EXAMPLE 2

Mixture of butyl dilaurylmercapto-tin chloride and butyl-laurylmercapto-tin dichloride Butyltin trichloride (92 parts, 0.33 mol) lauryl mercaptan (101 parts, 0.5 mol) and petroleum ether (B.P. 60–80° C.) (260 ml.) were mixed and heated to 55° C. Triethylamine (51 parts) was added dropwise while the temperature was maintained at 55–60° C. After cooling the product was thrice washed with small amounts of water, the organic layer stripped of solvent and filtered as in Example 1 to yield an equimolar mixture of butyl-laurylmercapto-tin dichloride and butyl-dilaurylmercapto-tin chloride.

EXAMPLE 3

Octyl-laurylmercapto-tin dichloride

Octyltin trichloride (68 parts, 0.2 mole), lauryl mercaptan (40 parts, 0.2 mole) and petroleum ether (B.P. 80–100° C.) (100 ml.) were mixed, heated to 60° C. and triethylamine (20 parts) added as in Example 2 and the mixture stirred for a further ½ hour. The amine hydrochloride was removed by filtration and the filtrate stripped of solvent to 80° C. at 14 mm. pressure. There was obtained octyl-laurylmercapto-tin dichloride (97.5 parts) as a very pale yellow liquid.

EXAMPLE 4

Butyl-dilaurylmercapto-tin chloride

Monobutyltin trilaurylmercaptide (124.2 parts) was equilibrated with butyltin trichloride (22.6 parts) by heating them together at 80° C. for 1.5 hrs. As a result of this disproportionation reaction there was produced butyl-dilaurylmercapto-tin chloride (Found: Sn, 19.5; S, 9.7; Cl, 5.8%; Calc. for $C_{28}H_{59}ClS_2Sn$: Sn, 19.4; S, 10.4; Cl, 5.8%.)

EXAMPLE 5

Dibutyl-laurylmercapto-tin chloride

Example 2 was repeated using dibutyltin dichloride (101.5 parts, 0.33 mol), lauryl mercaptan (67.5 parts 0.33 mole), petroleum ether (B.P. 80–100° C.) (200 ml.) and triethylamine (34 parts). There was obtained dibutyl-laurylmercapto-tin chloride.

EXAMPLES 6–9

Rigid polyvinyl chloride stock sheets were prepared by blending a vinyl dispersion polymer (100 parts) with stearic acid (0.5 part) and stabilizer (2.0 parts) on a two-roll mill at 155° C. for 10 minutes. The following stabilizers were used:

Example 6—Butyl-dilaurylmercapto-tin chloride;
Example 7—1:1 mixture of butyl-dilaurylmercapto-tin chloride with butyl-laurylmercapto-tin dichloride;
Example 8—Butyltin-dioctylmercapto-tin chloride; and
Example 9—Dibutyl-laurylmercapto-tin chloride; and as a comparative test dibutyltin dilaurylmercaptide which is a conventional stabilizer.

Samples of the stock sheets were aged in an oven (a) at 170° C. for up to 1 hour; (b) at 190° C. for up to 20 minutes; and (c) at 200° C. for up to 20 minutes. With each of the examples the initial colour of the stock sheets and its color after the ageing treatment were less than that of the comparative test.

EXAMPLES 10–13

Stock sheets of rigid polyvinyl chloride were prepared by milling the following formulations on a two-roll mill at 150° C. for 5 minutes.

|  | Parts |
|---|---|
| Polyvinyl chloride (Corvic D–559) | 100 |
| Stearyl alcohol (lubricant) | 1.5 |
| Butyl epoxy stearate (secondary stabilizer) | 3.0 |
| Organotin stabilizer as per Table I | 2.0 |

The resulting sheets were cut into strips and aged in a press at 175° C. Table I below indicates the colors of the samples after different ageing periods.

TABLE I

| Example | Stabilizer | Ageing period at 135° C. in minutes | | | |
| --- | --- | --- | --- | --- | --- |
|  |  | 5 | 15 | 30 | 60 |
| Comparative | Dibutyltin dilauryl mercaptide | Pale yellow | Yellow | Yellow | Yellow. |
| 10 | Butyl-di-laurylmercapto-tin chloride | Colorless | Colorless | Very pale yellow | Pale yellow brown. |
| 11 | 1:1 mixture of butyl-lauryl-mercapto-tin dichloride and butyl-dilauryl-mercapto-tin chloride. | do | do | do | Pale yellow. |
| 12 | Octyl-dilauryl-mercapto-tin chloride | do | do | do | Yellow brown. |
| 13 | Butyl-dioctyl-mercapto-tin chloride | do | do | Very pale brown | Pale brown. |

The examples each indicate that these compounds containing tin-carbon, tin-halogen and tin-sulphur-carbon bonds are superior stabilizers to a conventional organotin mercaptide stabilizer.

EXAMPLES 14–16

The technique of Examples 10–13 was repeated with the following formulation and with the ageing carried out in an oven at 170° C.

| | Parts |
|---|---|
| Polyvinyl chloride (Corvic D-559) | 100 |
| Stearic acid (lubricant) | 0.5 |
| Organotin stabilizer—in amount and as specified in Table II. | |

3. Butyl-dilaurylmercapto-tin chloride.
4. Butyl-laurylmercapto-tin dichloride.
5. Octyl-laurylmercapto-tin dichloride.
6. Octyl-dilaurylmercapto-tin chloride.
7. Dibutyl-laurylmercapto-tin chloride.

TABLE II

| Example | Stabilizer | Amount of stabilizer | Ageing period at 170° C. in minutes | | |
|---|---|---|---|---|---|
| | | | 15 | 30 | 60 |
| Comparative | Dibutyltin dilauryl mercaptide | 2.0 | Very pale yellow | Yellow | Dark yellow. |
| 14 | 1:1 mixture of butyl-dilauryl-mercapto-tin chloride and butyl-lauryl-mercapto-tin dichloride. | 1.64 | Colorless | Colorless | Very pale brown. |
| 15 | Butyl-dioctyl-mercapto-tin chloride | 1.6 | do | do | Very pale yellow. |
| 16 | As in Example 14 | 2.0 | do | do | Do. |

Again these examples illustrate the superiority of the compounds containing carbon-tin, tin-halogen and tin-sulphur-carbon bonds as stabilizers for polyvinyl chloride.

I claim:

1. The compounds having the general formula

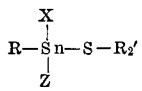

wherein R is an alkyl group having up to 20 carbon atoms, X is chlorine, $R_2'$ is an alkyl group having at least 5 carbon atoms and Z is selected from the group consisting of R, X, —SR' (where R' is an alkyl group having 5–20 carbon atoms).

2. Butyl-dioctylmercapto-tin chloride.

References Cited

UNITED STATES PATENTS

| 2,888,435 | 5/1959 | Wallace | 260—429.7 X |
| 2,914,506 | 11/1959 | Mack et al. | 260—429.7 X |
| 3,293,273 | 12/1966 | Gloskey | 260—429.7 |
| 2,786,813 | 3/1957 | McDermott | 260—429.7 X |
| 2,832,751 | 4/1958 | Weinberg et al. | 260—429.7 X |
| 3,112,331 | 11/1963 | Washburn et al. | 260—429.7 X |
| 3,328,441 | 6/1967 | Freiberg et al. | 260—429.7 X |
| 3,311,648 | 3/1967 | Herbstman et al. | 260—429.7 |

HELEN M. McCARTHY, Primary Examiner

W. F. BELLAMY, Assistant Examiner

U.S. Cl. X.R.

260—45.75